United States Patent [19]
McInerney et al.

[11] Patent Number: 6,012,134
[45] Date of Patent: Jan. 4, 2000

[54] HIGH-PERFORMANCE PROCESSOR WITH STREAMING BUFFER THAT FACILITATES PREFETCHING OF INSTRUCTIONS

[75] Inventors: Rory McInerney; Eric Sindelar, both of Sunnyvale; Tse-Yu Yeh, Milpitas; Kalpana Ramakrishnan, Belmont, all of Calif.

[73] Assignee: Institute for the Development of Emerging Architectures, L.L.C., Cupertino, Calif.

[21] Appl. No.: 09/057,968

[22] Filed: Apr. 9, 1998

[51] Int. Cl.[7] ................................. G06F 9/34; G06F 9/38
[52] U.S. Cl. ..................... 711/207; 711/205; 711/141; 712/210; 712/211
[58] Field of Search ..................... 711/205, 140, 711/118, 3, 154, 141, 130, 137, 207, 204, 117; 712/210, 207, 215, 233, 235, 239, 211, 219; 713/322

[56] References Cited

U.S. PATENT DOCUMENTS

| | | | |
|---|---|---|---|
| 5,148,536 | 9/1992 | Witek et al. ............................ | 711/140 |
| 5,553,255 | 9/1996 | Jain et al. ............................... | 712/235 |
| 5,586,295 | 12/1996 | Tran ........................................ | 711/137 |
| 5,590,294 | 12/1996 | Mirapuri et al. ...................... | 712/244 |
| 5,592,679 | 1/1997 | Yung ..................................... | 711/117 |
| 5,606,675 | 2/1997 | Sakamura et al. .................... | 712/237 |
| 5,634,103 | 5/1997 | Dietz et al. ............................ | 712/235 |
| 5,634,131 | 5/1997 | Matter et al. .......................... | 713/322 |
| 5,642,500 | 6/1997 | Inoue .................................... | 712/233 |

*Primary Examiner*—Daniel H. Pan
*Attorney, Agent, or Firm*—Blakely Sokoloff Taylor & Zafman, LLP

[57] ABSTRACT

A computer processor with a mechanism for improved prefetching of instructions into a local cache includes an instruction pointer multiplexer that generates one of a plurality of instruction pointers in a first pipeline stage, which is used to produce a physical address from an ITLB lookup. A comparison is performed by compare logic between the physical address (and tags) of a set in the local cache and the set associated with the selected instruction pointer. A way multiplexer selects the proper way output from either the compare logic or an instruction streaming buffer that stores instructions returned from the first cache, but not yet written into the local cache. An instruction is bypassed to the way multiplexer from the instruction streaming buffer in response to an instruction streaming buffer hit and a miss signal by the compare logic.

16 Claims, 6 Drawing Sheets

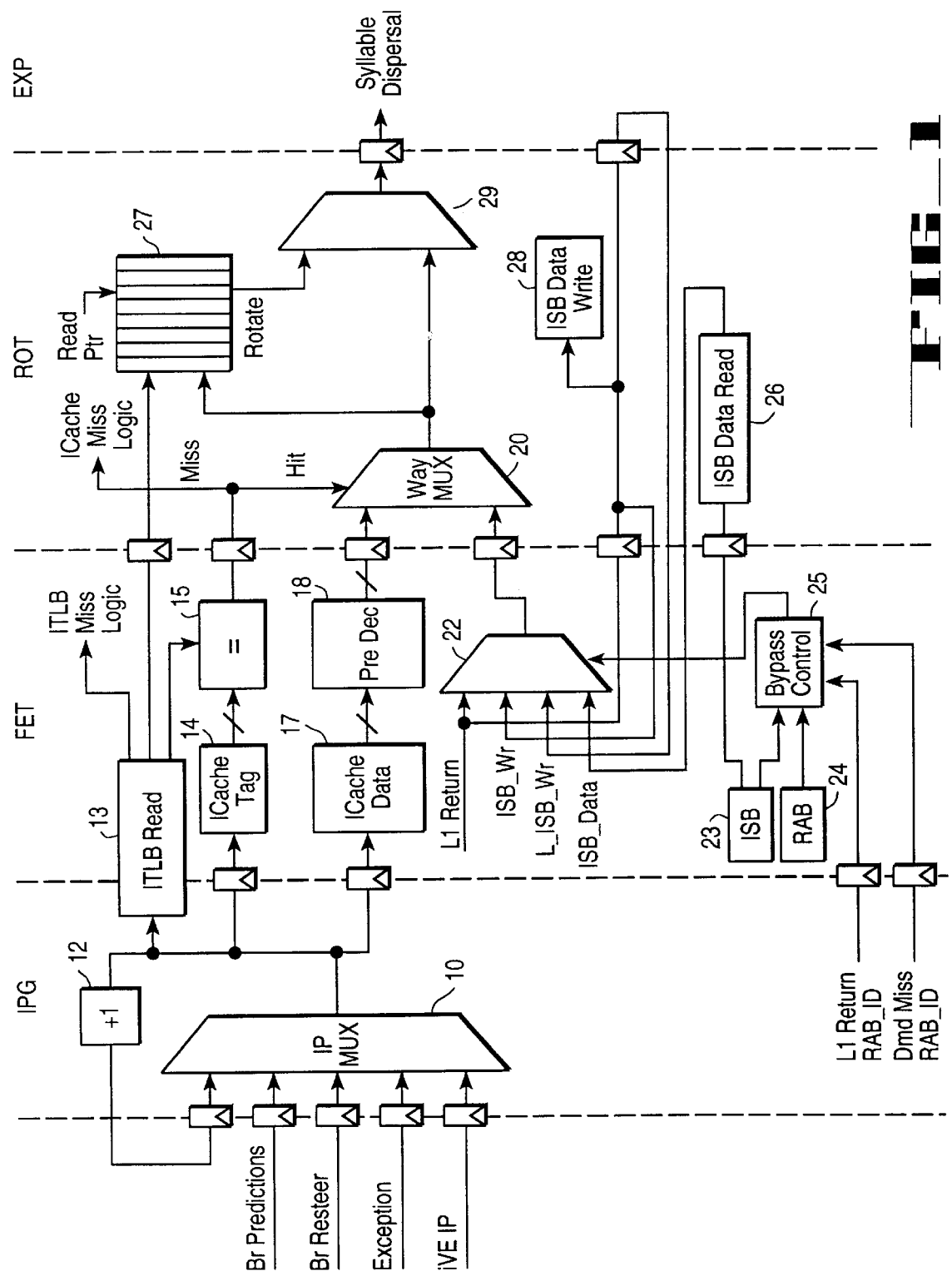

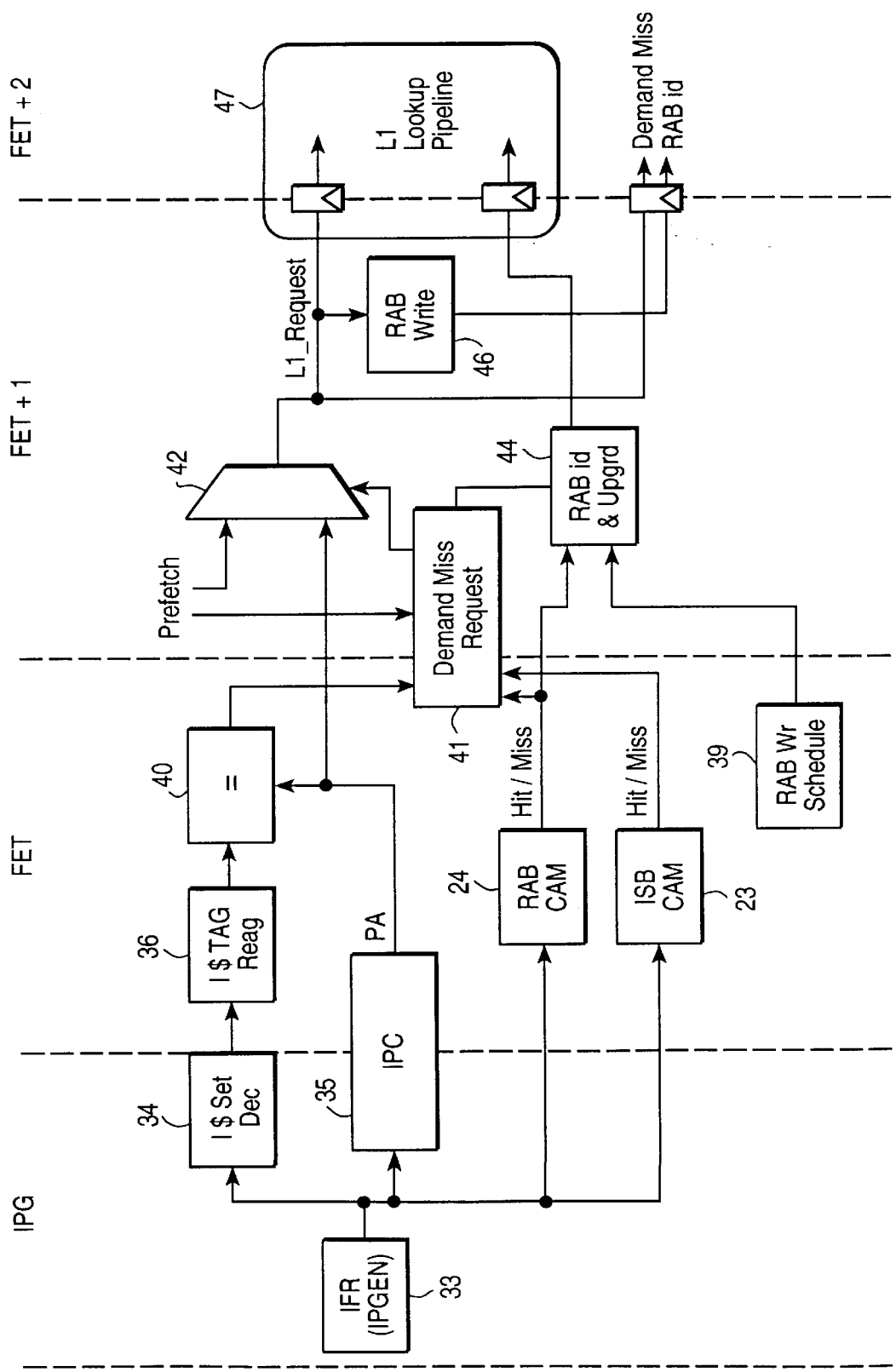
FIG_22

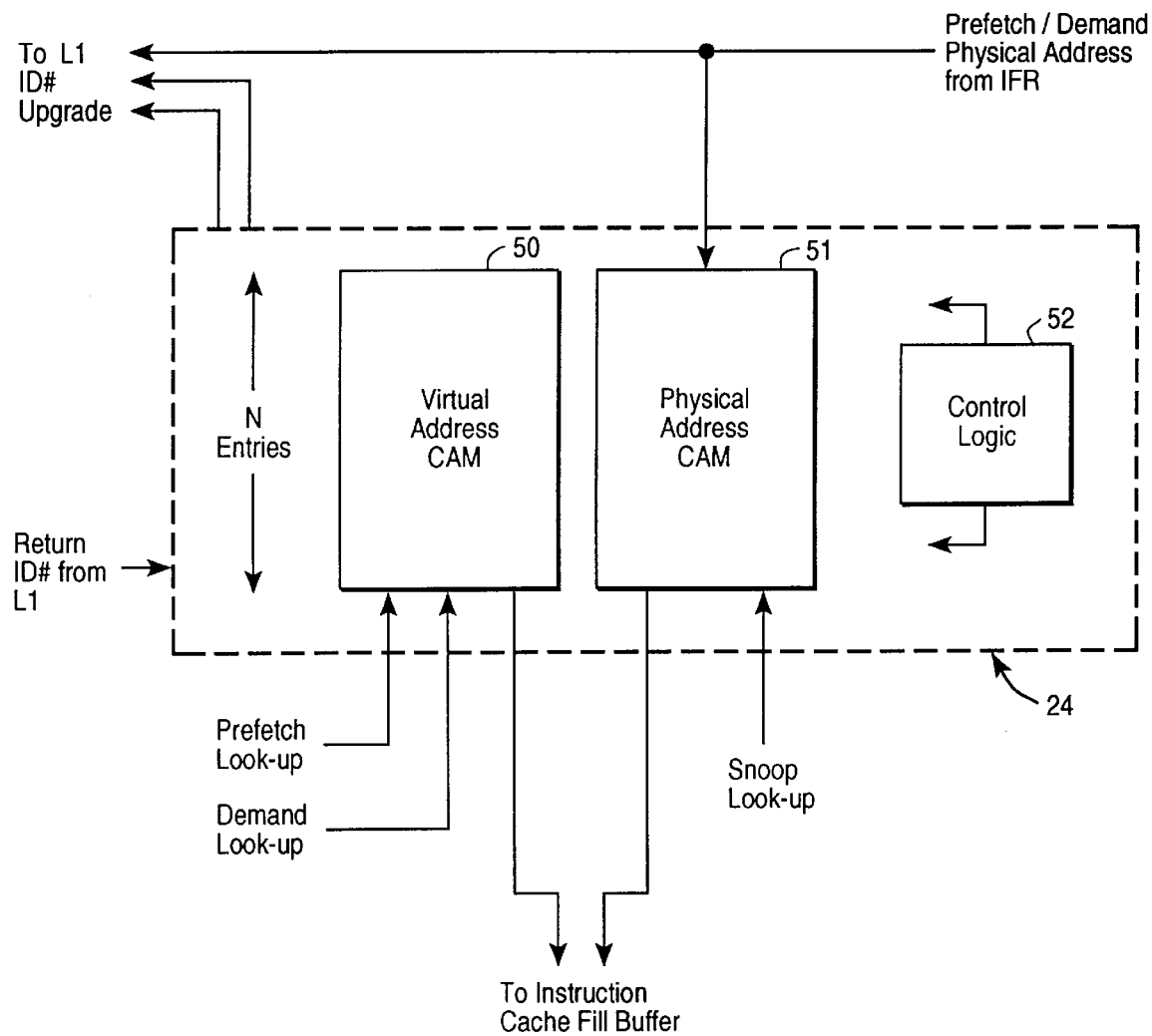
FIG_3

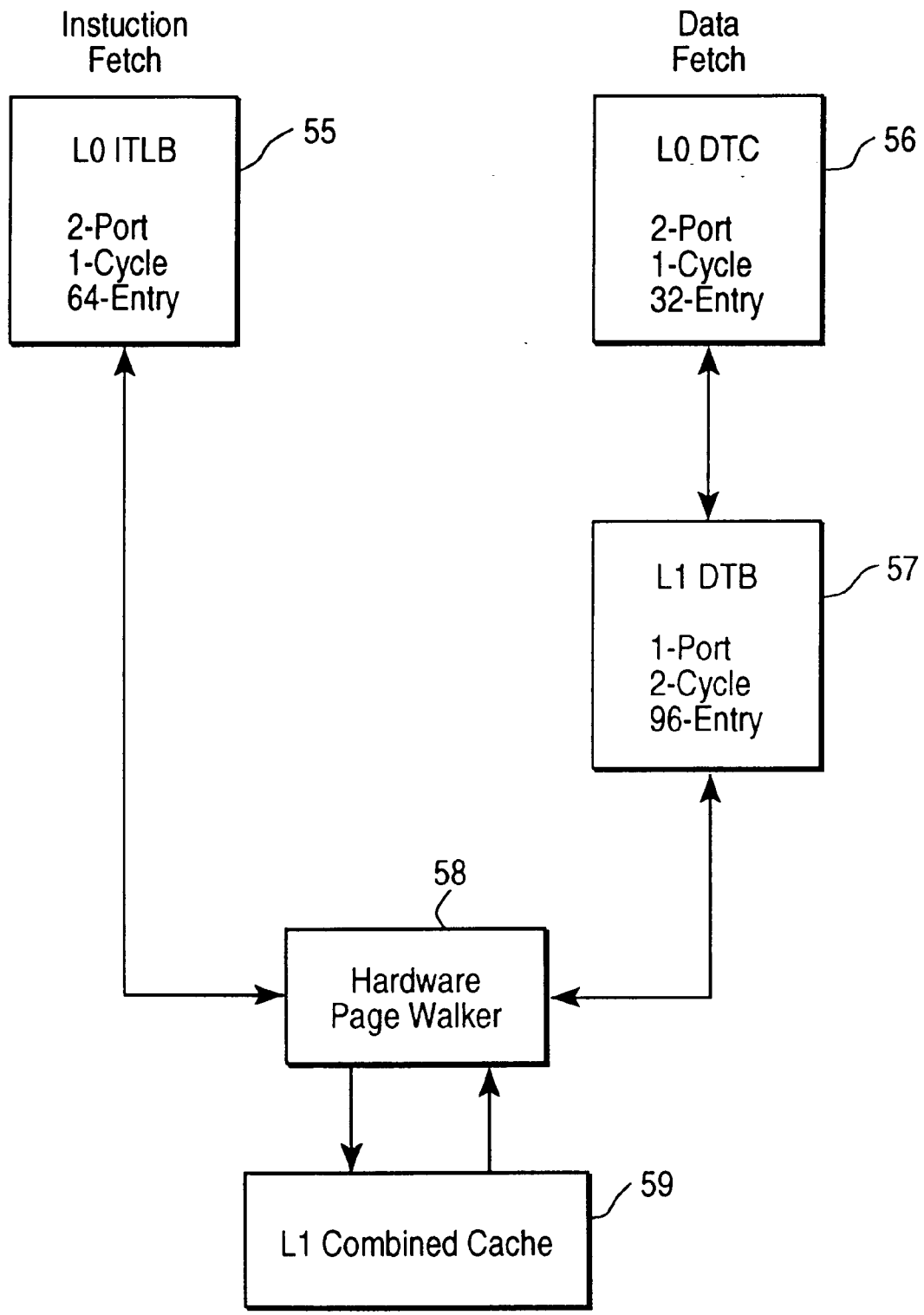
FIG_4

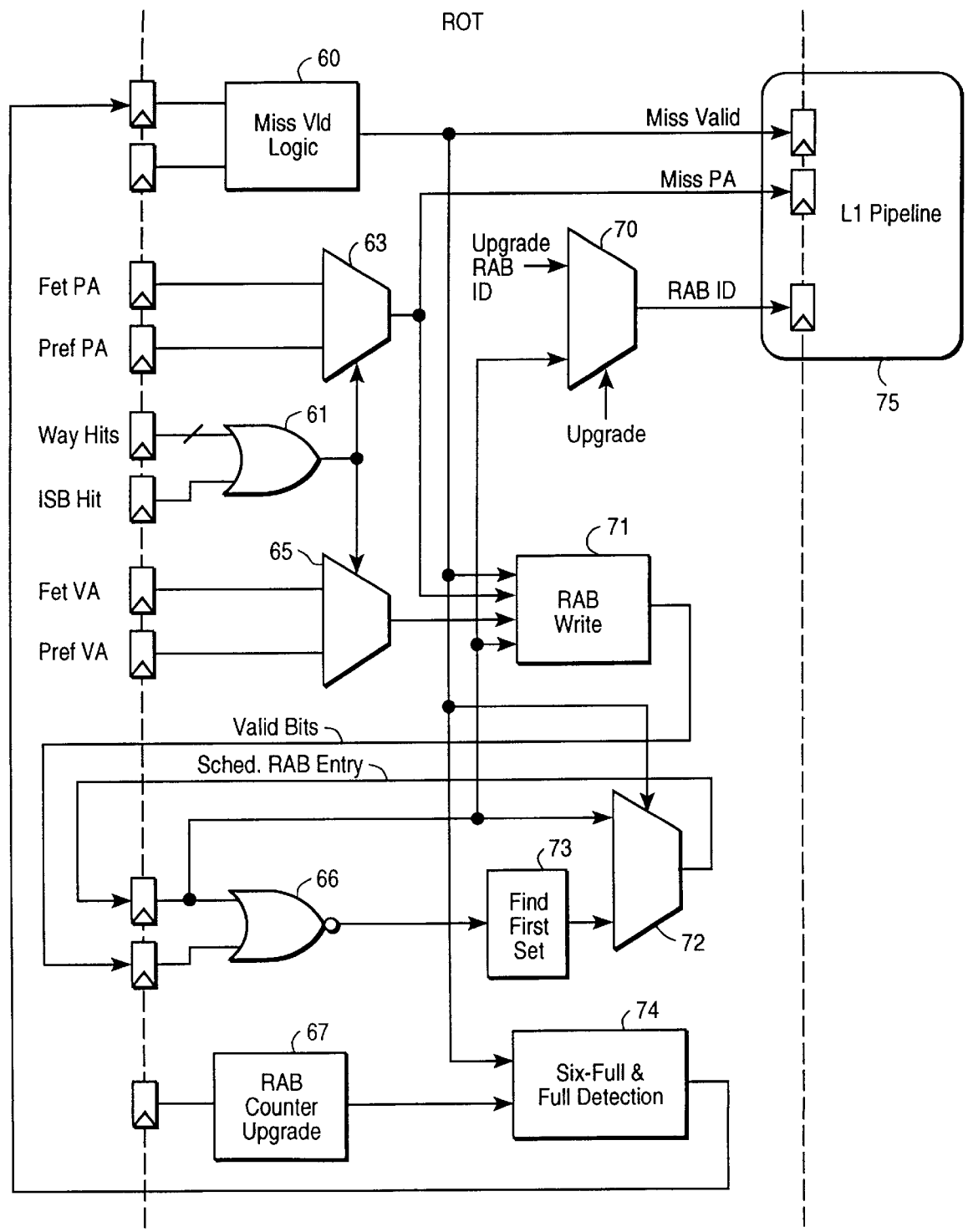
FIG_5

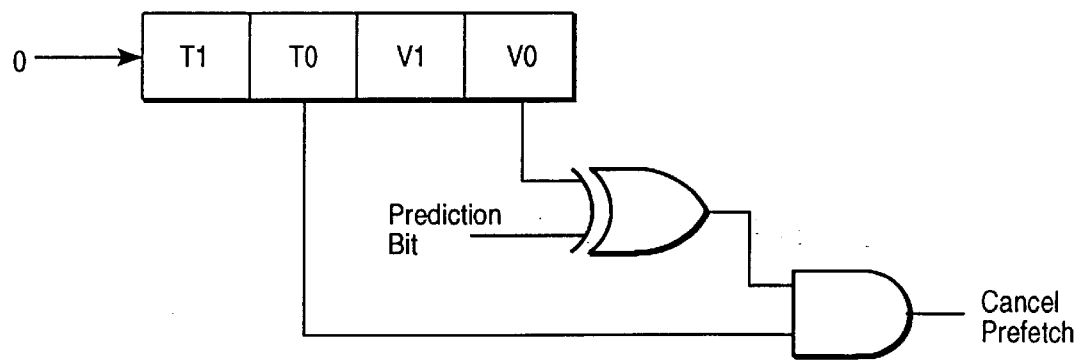
FIG_6
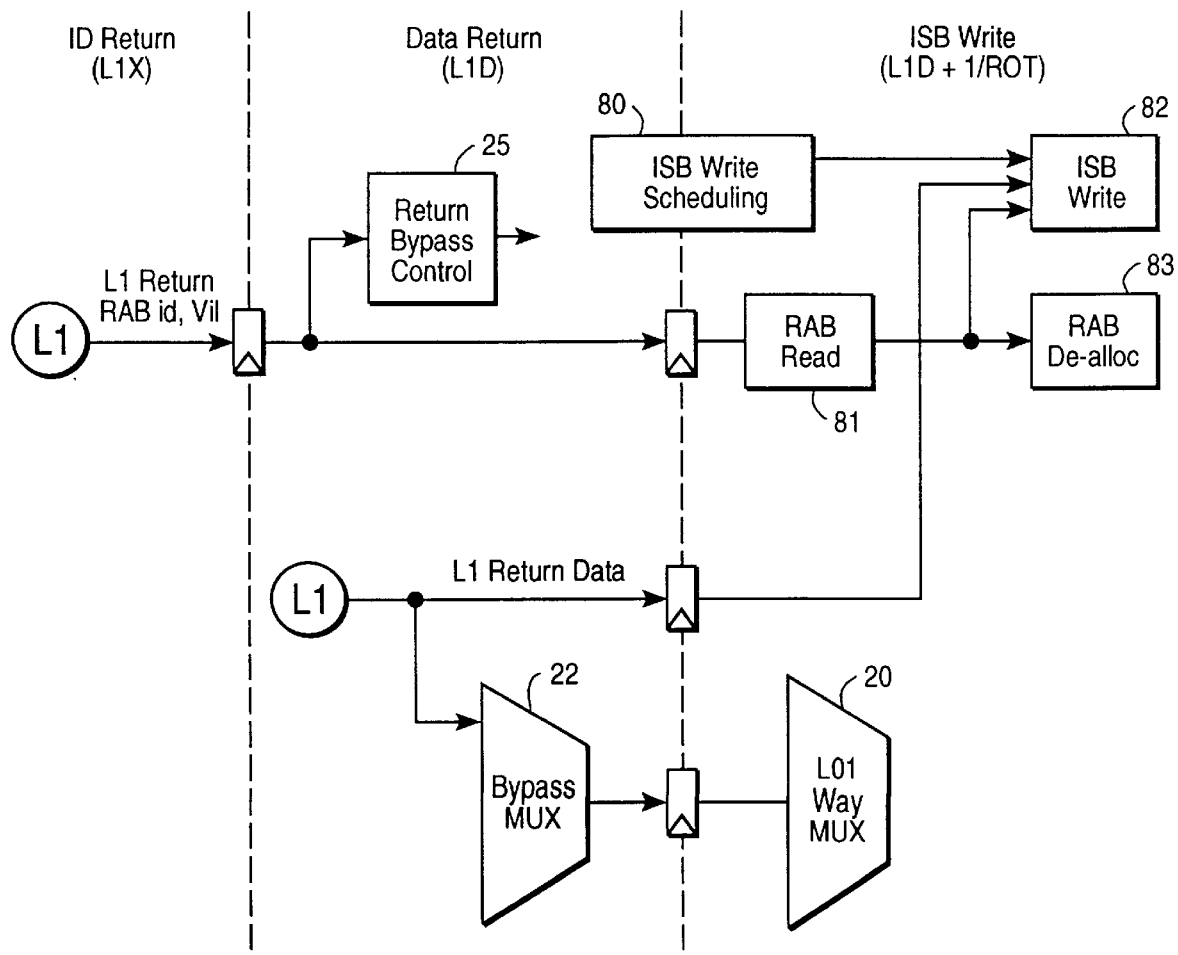
FIG_7

HIGH-PERFORMANCE PROCESSOR WITH STREAMING BUFFER THAT FACILITATES PREFETCHING OF INSTRUCTIONS

FIELD OF THE INVENTION

The present invention is generally related to the field of microprocessors. More particularly, the invention relates to prefetching schemes for improving instruction processing speed in high-performance computer systems.

BACKGROUND OF THE INVENTION

As the operating frequencies of microprocessors continues to rise, performance often depends upon providing a continual stream of instructions and data in accordance with the computer program that is running. As such, many processors include branch prediction circuitry that is used to predict branch addresses and to cause the prefetching of instructions in the instruction stream before they are needed. For example, U.S. Pat. No. 5,469,551 discloses a branch prediction circuit along with a subroutine stack used to predict branch address and prefetch at the instruction stream.

As application programs get larger, instruction fetch penalty has become one of the major bottlenecks in system performance. Instruction fetch penalty refers to the number of cycles spent in fetching instruction from different levels of cache memories and main memory. Instruction prefetch is an effective way to reduce the instruction fetch penalty by prefetching instructions from long-latency cache memories or main memory to short-latency caches. The basic idea of any instruction prefetching scheme is to pre-load instructions from external memory or a higher-level cache into the local instruction cache that is most closely associated with the execution unit of the processor. Therefore, when instructions are actually demanded, the fetch penalty of the instructions is small.

When instructions are immediately available in the local cache memory of the processor, program execution precedes smoothly and rapidly. However, if an instruction is not resident in the on-chip instruction cache, the processor must request the instruction from a higher-level cache or from external memory. If the instruction is present in the higher-level cache (e.g., the L1 cache) the delay may only be around eight clock cycles of the processor. The cost of generating a bus cycle to access external memory is much greater: on the order of a hundred clock cycles or more. This means that program execution must halt or be postponed until the required instruction returns from memory. Hence, prefetching is aimed at bringing instructions into a cache local to the processor prior to the time the instruction is actually needed in the programmed sequence of instructions.

It is equally important for the instruction prefetch mechanism to acquire the correct instructions. Because a prefetch needs to be performed before the program actually reaches the prefetch target, the prefetch target is often chosen based on a prediction of the branch. When a branch is predicted correctly, the demanded instructions are prefetched into short-latency caches, thus reducing the fetch penalty. However, when a branch is predicted incorrectly, the prefetched instructions are not useful. In some cases, incorrectly prefetched instructions can actually be harmful to the program flow because they cause cache pollution. In addition, often times prefetching incorrect branch targets results in a "stall" condition in which the processor is idle while the main memory or long-latency cache memories are busy acquiring the critically-demanded instructions.

To overcome these difficulties, designers have developed a variety of different systems and methods for avoiding stalls. By way of example, U.S. Pat. No. 5,396,604 teaches an approach that obviates the need for defining a new instruction in the instruction set architecture of the processor.

Yet another approach for reducing the cache miss penalty is to maintain a scoreboard bit for each word in a cache line in order to prevent the writing over of words previously written by a store instruction. U.S. Pat. No. 5,471,602 teaches a method for improving performance by allowing stores which miss the cache to complete in advance of the miss copy-in.

While each of these systems and methods provides improvement in processor performance, there still exists a need to increase the overall speed of prefetching operations. In other words, by its nature prefetching is a speculative operation. In previous architectures, hardware implementations have been used to bring instructions into the machine prior to execution. Past approaches, however, have failed to make best use of memory bandwidth by specifying how much to prefetch, in addition to where and when to prefetch instructions. That is, many machines simply prefetch in the next sequential line of instructions following a cache miss because most instructions exhibit sequential behavior.

To minimize the instruction fetch penalty and to increase the accuracy of prefetching operations, it is therefore desirable to provide a new mechanism for instruction prefetching.

SUMMARY OF THE INVENTION

An apparatus is disclosed for prefetching instructions from a first cache to an instruction cache of a processor. In one embodiment, the apparatus comprises an instruction pointer multiplexer that generates one of a plurality of instruction pointers in a first pipeline stage (i.e., pipestage) of the processor. An instruction streaming buffer is included to store instructions that have been returned from the first cache before they are actually written into the instruction cache.

The apparatus further includes an instruction translation look-aside buffer that produces a physical address from the selected instruction pointer. A comparison is then performed by compare logic between the physical address (and tags) of a set in the instruction cache and the set associated with the selected instruction pointer. The comparison happens in a first pipestage of the processor. A way multiplexer is coupled to the compare logic and the instruction streaming buffer. The way multiplexer has an output that provides an instruction from the set in the instruction cache responsive to a hit signal generated by the compare logic. When a miss signal is produced by the compare logic, the instruction streaming buffer is read in a third pipeline stage, with the instruction being bypassed to the way multiplexer from the instruction streaming buffer in response to an instruction streaming buffer hit.

The apparatus may also include a rotate buffer coupled to the output of the way multiplexer. The rotate buffer stores and rotates instructions prior to dispersal within the processor

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

FIG. 1 illustrates the instruction fetch pipeline in accordance with one embodiment of the present invention.

FIG. 2 is a diagram illustrating the functionality of both the prefetch and demand miss pipelines in accordance with one embodiment of the present invention.

FIG. 3 is a block diagram showing the structure of the request address buffer.

FIG. 4 is a block diagram illustrating a translation look-aside buffer hierarchy.

FIG. 5 illustrates the request address buffer scheduling and write pipelines for one embodiment of the present invention.

FIG. 6 is a logic block diagram showing the use of trace cancellation vector and tenure bits for prefetch cancellation.

FIG. 7 illustrates the L1 instruction return pipeline for demand fetch and prefetch in accordance with one embodiment of the present invention.

DETAILED DESCRIPTION

The computer system of the present invention includes a mechanism for improved prefetching of instructions into a cache closely associated with a central processing unit. In the following description, numerous specific details are set forth, such as memory organizations, logic blocks, addressing methods, etc., in order to provide a thorough understanding of the present invention. Practitioners having ordinary skill in the data processing arts will understand that the invention may be practiced without many of these specific details. In other instances, well-known signal timings, components, and circuits have not been described in detail to avoid obscuring the invention.

Functional Overview

In one embodiment of the present invention, instruction fetching, instruction prefetching, address translation, and branch prediction pipeline operations all occur in the front-end section of the processor. The front-end of the machine is therefore responsible for fetching instructions from memory, translating virtual instruction addresses to their physical counterparts, prefetching instructions, and making branch predictions. Although not heavily involved in maintaining the architecture status of the machine, the front-end operations do have a great impact on the performance of the processor.

The instruction fetch pipeline is responsible for fetching the program instructions without incurring large latency penalties. The instruction address pipeline translates the virtual addresses into physical addresses, so that the instruction fetch can be completed. The instruction prefetch pipeline prefetches instructions into the on-chip (L0) instruction cache before they are actually demanded. In this way, the prefetch pipeline hides the cache miss latency. The branch prediction pipeline makes predictions for branches and speculates down the predicted paths so program execution does not need to wait for branch execution to complete.

There are three major pipeline stages associated with the front-end section of the processor of the present invention. These are shown in FIG. 1 as the instruction pointer generation (IPG) stage, the fetch (FET) stage, and the rotate (ROT) stage. Of the four major pipelines, instruction fetch, address translation, and branch prediction follow these three pipeline stages. The instruction prefetch pipeline, on the other hand, is separate and runs asynchronous to the main pipeline.

In the main pipeline, IPG pipeline stage is used for generating an instruction fetch address. The FET stage is used for fetching instructions from the L0 instruction cache, translating addresses, and making dynamic branch predictions. Lastly, the ROT stage is used for buffering instructions and for presenting instructions to the instruction dispersal logic of the processor. Following dispersal, the instructions are eventually executed by the processor's execution core.

The instruction fetch pipeline accesses the L0 instruction cache which, in one embodiment of the present invention, is an on-chip that is closely associated with the processor's execution core. All of the L0 instruction cache miss requests are sent to the L1 cache. In one embodiment, the L1 cache is a combined cache which is shared between instructions and data. After the missed instructions are returned back from the L1 cache, they are bypassed into the ROT stage. In the ROT stage, instructions get buffered and rotated to maximize the throughput of the instruction dispersal logic. In addition, instructions are predecoded for dispersal and prediction needs.

The instruction prefetch pipeline receives prefetch requests from the branch prediction pipeline. It starts the prefetch request in a pipelined manner similiar to the instruction fetch pipeline to filter out requests that have accessed any instruction cache structures and which have already been fetched. If a prefetch passes this filtering, a request is then sent out to the L1 cache. The instruction prefetch pipeline is also responsible for handling the bypasses of the L1 returned instructions to the main pipeline, interfacing with the L1 cache, and storing the instructions before they are filled into the L0 instruction cache.

The address translation pipeline accesses a single level instruction translation look-aside buffer (ITLB) structure. Because there is no second level TLB in the described processor, whenever an ITLB miss occurs, a hardware page walk is triggered. The ITLB receives operations from the hardware page walker for performing inserts or purges. In addition, the ITLB is also responsible for generating various faults related to the ITLB accesses.

The branch prediction pipeline uses several structures to maximize the prediction accuracy and to minimize hardware implementation costs. Based on the frequency of various prediction cases, there are various possible re-steer points in the front-end pipeline. The branch prediction pipeline interacts with the branch execution pipeline to maintain both performance and correctness of the program execution. The branch execution pipeline receives prediction information from the branch prediction pipeline and validates it against the actual execution results. This pipeline also decodes branch and branch predict instructions for initiating prefetch requests.

Instruction Fetch/Prefetch Pipelines

In a normal machine, as the execution unit consumes instructions in the program sequence new instructions must be constantly supplied; usually from the cache memory hierarchy associated with the processor. As discussed above, this is the purpose of fetching and prefetching instructions from the higher of the cache memory hierarchy into the lowest, L0 instruction cache of the processor.

One of the ways that the present invention achieves improved processor performance is through the use of a small buffer that stores instructions returning from the L1 cache before they are filled or written into the L0 instruction cache. This buffer, called an instruction streaming buffer (ISB), simplifies prefetching operations by de-coupling the two cache pipelines. Use of the ISB obviates the full penalty of writing a line of information into the L0 cache, as well as the penalty of performing an L0 cache lookup when an instruction is demanded by the processor.

FIG. 1 illustrates the instruction fetch pipeline of one embodiment of the present invention. As previously described, the instruction fetch pipeline has the responsibility of fetching and providing a constant stream of instructions to the instruction dispersal logic. To achieve this end, the three main pipeline stages function as follows.

The IP generation stage includes an instruction pointer multiplexer 10 that selects one of the incoming instruction addresses for fetching instructions, following a set priority between the available addresses. As shown in FIG. 1, these addresses may result from branch prediction, branch re-steering, or an exception. Additionally, a separate instruction address associated with different instruction set architecture may be provided as an input to multiplexer 10. This additional input is shown in FIG. 1 as the iVE IP. Obviously, an assortment of various other instruction addresses may also be selected during the IPG stage. These may include branch misprediction flush, prediction flush, and in-line addressing, with priority order from high to low. Another source of an incoming instruction address is simply the incremented sequential address of the current instruction, as indicated by block 12 in FIG. 1.

Note that in the IPG pipeline stage, the set decode of the fetch address is performed for the L0 instruction cache. This allows the next cycle to be reserved entirely for accessing the cache data array.

The output of IP multiplexer 10 feeds the FET pipeline stage. The instruction address is utilized in this stage to access the L0 instruction data array. The instruction cache data array 17 is, in one implementation of the invention, a 16 Kbyte, 4-way, set-associative cache used for fast storage of instructions; it provides 32 bytes for each instruction fetch. This means that four, 32-byte words are read out in the fetch cycle. The hit way among the four output ways is selected during the rotate cycle by way multiplexer 20.

The L0 instruction tag array 14 is also accessed in the FET stage. The output tags are compared with the physical addresses provided by the ITLB 13 in order to generate the hit signals used in controlling the L0 instruction way multiplexer. This comparison is represented in FIG. 1 by block 15. Predecoding of the instruction cache data output is performed by block 18.

In the embodiment of FIG. 1, ITLB 13 is a single-level, fully-associative 64-entry structure which can be CAMMed by the virtual address. The CAMMing result is used in the next stage for reading out the page information which includes the physical address, protection bits, memory attributes, etc. If the ITLB content addressable memory yields a hit, the ITLB random access memory is read out during the FET stage.

The physical address of the fetch address gets sent to the L0 instruction tag comparators immediately for determining the hit/miss condition of each way of the L0 instruction cache. In addition, the page information is also read out to determine the faulting condition defined in the architecture and memory attributes of the page (not shown in FIG. 1). If a fault occurs on the page being accessed, a fault signal is generated and the fetch of the instruction from the L1 cache is suppressed (in the case of an L0 instruction miss). In the event that the ITLB cam yields a miss and the virtual addressing mode is enabled in the processor, a request is sent to hardware page walker logic for obtaining the needed page information. The missed request is sent out in the next cycle after the missed condition has been determined.

Furthermore, a re-steer signal is generated by the ITLB to the branch prediction unit of the processor for re-steering the instruction fetch pipeline back to the missed address. When the missed address restarts from the IPG pipeline stage (which is in the cycle after the re-steer signal is generated), the ITLB asserts a signal to stall the IPG/FET latches until the missed page information has been returned from the hardware page walker circuitry.

In the ROT pipeline stage, the hit way is selected from the four output ways of the L0 instruction cache by way multiplexer 20. The 32-byte instructions are sent to the instruction rotate buffer 27 for storage. From buffer 27, instructions are read out and presented to dispersal logic in the next pipeline stage of the processor. Should buffer 27 become empty, instructions can be bypassed directly from the way multiplexer to the dispersal logic via multiplexer 29.

Practitioners will further appreciate that buffer 27 is useful in hiding instruction fetch and branch prediction bubbles, due, in part, to the fetch rate being higher than the consumption rate in the execution pipeline. By storing the instructions in buffer 27, the instruction fetch pipeline can run ahead of the execution pipeline. When a L0 instruction cache miss occurs, some instructions may still be available from buffer 27 for feeding the execution pipelines.

Note that if none of the L0 instruction ways is hit, the fetch pipeline may be stalled, in which case instructions may be provided from the bypass path (which includes multiplexer 29) coupled to one of the inputs of way multiplexer 20. As will be discussed in more detail shortly, instructions can be provided from ISB 23 in the event of an ISB hit, an ISB write bypass, or a L1 return bypass.

After the instructions have been output by way multiplexer 20, they may be stored directly into buffer 27 or bypassed to the dispersal logic. When both the L0 instruction cache and ISB 23 are missed for an instruction fetch, an instruction miss request is sent to the L1 cache to obtain the needed instructions. After the instructions have been returned from the L1, they may be bypassed directly into the ROT stage. This operation is controlled by bypass control logic 25 which may select the L1 return bypass path via multiplexer 22.

ISB Functionality

Instruction streaming buffer (ISB) 23 is a buffer that stores instructions returned from the L1 cache before they actually get written into the L0 instruction cache. In one implementation, ISB has eight 32-byte entries. Each entry stores the instruction, the associated virtual and physical addresses. In the FET stage, the virtual address of the fetch is used to content-address match the virtual address array. If the CAMMing yields a hit, the ISB data array is read out in the next cycle, with the instructions being bypassed directly to way multiplexer 20 in the following cycle. Thus, the benefit of ISB 23 is that it allows the instruction fetch pipeline to stall for only one cycle, instead of taking a full L0 instruction cache miss.

The full advantage of the ISB instruction becomes evident when prefetches are used aggressively by software and hardware. In this situation, a lot of instructions should be present in the ISB 23 when the processor issues an instruction demand request. Rather than having to sequence through a page translation and a read access to the L0 instruction cache, a lookup in ISB 23 allows the processor to quickly access the instruction directly from the ISB. This is shown in FIG. 1 by ISB data read block 26 coupled through bypass multiplexer 22. Bypass multiplexer 22 has its output coupled to one of the inputs of way multiplexer 20. In this way, ISB 23 functions like a read buffer for prefetching instructions.

As explained above, a lookup to ISB 23 allows instructions to be read directly without waiting for those instructions to be first written into the L0 instruction cache. In addition, a variety of different bypass sources are also provided as inputs to multiplexer 22. These sources include several ISB write bypasses and a L1 return direct bypass mechanism. These additional bypasses further improve the performance of the processor, as will be discussed in a later section.

Note that the instructions returned from the L1 cache get written into the CAM array of ISB 23 during the ROT stage, as indicated by block 28 in FIG. 1.

It should be understood that in presently described embodiment, prefetches are a highest priority lookup. This means that when the execution unit of the processor actually demands an instruction, priority changes need to be made. For example, if the ISB had stacked up ten prefetch instructions and the execution unit demands the instruction on the bottom of the stack, the priority of that prefetch should be upgraded from a prefetch request to a demand request. This is the function of the request address buffer (RAB) 24.

The size of the ISB can vary, but it should be chosen to be large enough so that the ISB does not fill often. This property is insured by an aggressive instruction cache fill policy, meaning that a fill can appear whenever the instruction cache is idle. With an aggressive instruction cache fill policy, the algorithm for storing (write) and removing (read) data should efficiently implement a priority first-in-first-out (FIFO) buffer.

instructions stored in ISB 23 are marked either as accessed or nonaccessed, where accessed data has a higher priority. Demand fetch instructions are marked as accessed since they are used immediately, whereas prefetch instructions are marked as non-accessed since they are speculative.

Instructions returned from the L1 cache may be written into ISB 23 using the following algorithm:

First empty ISB entry
First non-accessed ISB entry
Default ISB entry (e.g., entry 0)

Instructions remain in ISB 23 until they are filled to the instruction cache, unless they are overwritten. If the ISB is empty, then no data can be sent to the instruction cache even if a fill is requested. In one implementation, the fill scheduling algorithm is as follows:

First ISB entry marked accessed
First ISB entry marked non-accessed

Note that in this scheduling algorithm, "first" refers to the fact that the entries have an order associated with them, i.e., entry 0, entry 1, . . . , entry N.

Instruction Miss Processing/RAB

Early in the ROT stage, L0 instruction cache miss logic determines whether a miss request should be sent to the L1 cache. For example, if a fetch hits the ILTB, but misses the L0 instruction cache, ISB, and all of the bypass cases (shown as inputs to bypass multiplexer 22), a miss request is generated and sent out to the L1 cache. When a miss is sent to the L1, its physical address and virtual address are registered in request access buffer (RAB) 24. In one implementation, RAB 24 is an eight entry structure, with each entry having an associated identification (ID). The ID of each entry used to store the miss request is sent together with the physical address to the L1 cache.

As previously discussed, the ID of the entry used to store the miss request is sent together with the physical address to the L1 cache. This ID is later sent back from the L1 along with the requested information to identify the returned instructions. In this way, the physical address to the instructions need not be sent back, thereby reducing the physical routing of wires between the L1 cache and the instruction fetch pipeline.

With reference now to FIG. 2, there is shown the operation of the RAB 24 in relation to the instruction fetch pipeline for one embodiment of the present invention. The request address buffer employed in the present invention solves problems associated with routing of wires and signal flight times due to physical distances between various circuit/logic units and the high frequency of the microprocessor's operation. By only sending necessary information, and referencing the remaining information locally with an identification number, RAB 24 decreases the number of signals that are transmitted between the functional units on the microprocessor chip.

While performing prefetching, it is appreciated that the processor may make a demand request for a particular instruction. If that particular instruction has already been prefetched, it may be stored either in the ISB 38 or in the local instruction cache itself. Alternatively, that particular instruction could also be in the L1 cache awaiting to be accessed. This means that after an instruction demand has been generated, the ISB must first be checked; in the event of a miss to the ISB, then a request must be sent out to the L1 cache. If a lookup to the L1 cache results in a miss, the demanded instruction must be fetched from an off-chip memory location. However, it should be understood that the L1 cache is constantly servicing both prefetches and regular demands. When a request is sent to the L1 for an instruction, it is possible that the L1 could be stalled, stuck, or otherwise preoccupied servicing other requests. The request address buffer solves this potential difficulty.

The RAB 24 is the mechanism which keeps track of the prefetch and demand fetches that are currently being serviced by the L1 cache. This provides a considerable improvement in processor performance since a situation could arise where the fetch unit demands the prefetched instruction before it has returned from the L1 cache. Without some sort of tracking mechanism, multiple requests for the same instruction would occur. In addition to tracking which instructions are in the process of being prefetched, RAB 24 further reduces the latency of a demand fetch when the requested instruction is currently in the L1 prefetch buffer. In this situation, an upgrade identification signal is sent to the L1 cache to convert the prefetch request to a demand request.

With reference now to FIG. 3, there is shown a block diagram of the request address buffer in one implementation of the present invention. RAB 24 comprises a virtual address CAM 50, a physical address CAM 51 and control logic 52 which interfaces with both units 50 and 51. Each of the CAMs 50 and 51 comprise n entries, where n is an integer chosen based upon design considerations. Because RAB 24 stores both the virtual and physical addresses, there is no need for a translation to occur before a CAM match can be performed. This feature also decreases the number of clock cycles in the pipeline.

Note that virtual address CAM 50 receives both prefetch and demand lookups, while physical address CAM 51 receives snoop lookups. The multiple CAM ports facilitate parallel lookups of the addresses stored in the RAB 24.

When a prefetch request is generated, the virtual and physical addresses stored in RAB 24 are sent to the L1 cache along with an ID number that identifies the request. Subsequent prefetch and fetch of virtual address are then looked up in RAB 24 in parallel with the lookup to the L0 instruction cache.

FIG. 2 illustrates the functionality of both the prefetch and demand miss pipelines in accordance with one embodiment of the present invention. Instruction pointer generation is shown occurring at block 33 in the IPG pipeline stage. Instruction cache set decoding and tag reading are shown respectively occurring in blocks 34 and 36. In the FET pipeline stage, IPC 35 provides a physical address that is compared with the read-out from the L0 instruction cache. This comparison is illustrated in FIG. 2 by block 40.

Concurrent with the instruction cache tag read, lookups are performed in both the ISB CAM 23 and RAB CAM 24 during the FET pipeline stage. This is so an immediate determination can be made whether the instruction is contained in the ISB, or is currently being serviced by the L1 cache. If the instruction is not found in the RAB, then a prefetch or a demand fetch is generated to the L1 cache. Of course, a prefetch hit to RAB 24 will cause the prefetch to be canceled. On the other hand, a demand fetch hit in the RAB causes an upgrade signal to be sent by logic block 44 to the L1 cache. Referring to FIG. 2 this is shown occurring in the FET+1 pipeline stage.

Note that in FIG. 3, the virtual address CAM 50 has separate ports for prefetch and demand fetch requests to allow lookups to both be performed in parallel. When the requested instruction is returned from the L1 cache, the corresponding RAB entry is invalidated. The virtual and physical addresses are then copied to an instruction cache fill buffer to be stored with the corresponding instruction data from the L1 cache.

Upon instruction return from the L1 cache, one 32-byte line is returned at a time. For each miss request sent to the L1 cache, if the requested fetch address accesses the lower 32-byte chunk of a 64-byte L1 line, two 32-byte chunks (i.e., two L0 lines) are returned. The reason for this is because the program is likely to miss on the upper 32-byte chunk immediately afterward. It should be understood that these two 32-byte chunks may not be returned in consecutive cycles; however, the requested lower 32-byte chunk is returned first since it is more critical to performance. If the requested fetch address accesses the upper 32-byte chunk of a 64-byte L1 line, only the requested 32-byte chunk is returned from the L1 cache for that particular request.

L1 requests are shown in FIG. 2 being generated at the output of multiplexer 42, which selects between the prefetch address or the physical address generated by block 35. Multiplexer 42 is controlled by demand miss request logic lock 41. The L1 request is generated in the FET+1 pipeline stage, while the actual L1 look-up occurs in the FET+2 pipeline stage, as illustrated by block 47.

Scheduling of the RAB write operations occurs in the FET pipeline stage (block 39), whereas the actual writing to the memory arrays of the RAB occurs in the FET+1 pipeline stage (block 46).

In the case where there is an existing older request in RAB 24 accessing to the upper 32-byte chunk of an L1 line, a newer request accessing the lower 32-byte chunk still returns two 32-byte chunks back from the L1 cache. The second 32-byte chunk is therefore duplicated. Note that there is a logic in ISB 23 to ensure that no duplicated data line is filled in the L0 instruction cache.

It should be understood that when instructions are returned from the L1 cache, their addresses are not sent back with them; rather only the RAB ID and an address bit 5 are sent back. The returned RAB ID is used to read out the instruction's virtual and physical addresses from RAB 24. Address bit 5 is used to distinguish the lower and upper halves of the line, and also to clear a flag in RAB 24 which indicates the 32-byte chunk has returned.

Since both software prefetches and regular demand misses can occur in the processor of the present invention, one bit is sent with each L1 request to indicate its type. Using the type bit, the L1 cache can determine the urgency of the fetch request. For example, a demand miss is always more urgent than a prefetch miss. However, sometimes when a demand miss occurs, there may have been already a prefetch ongoing in the L1 to the same address. This case is detected in accordance with the present invention by CAM-Ming the RAB using the virtual address of the fetch. Since the prefetch sent to the L1 is also registered in RAB 24, the demand fetch may result in a hit in the RAB which indicates an ongoing prefetch to the same address. In this instance, another signal is sent together with the request to the L1 to indicate the previous prefetch should be upgraded to a demand fetch having a higher priority. The upgrading function is illustrated in FIG. 2 by block 44. The prefetch request's RAB ID remains the same and no different entry is allocated.

Practitioners in the art will appreciate that the prefetch pipeline is separate from the demand fetch pipeline. The prefetch pipeline has its own lookup ports into the instruction storage structures, even though it shares the same L1 miss request bus with the demand fetch. In the case when both demand fetches and prefetches need to issue a request to the L1 cache, the demand miss is granted the higher priority. This arbitration is performed early in the ROT pipeline stage.

Demand fetch and prefetches also have different priorities in gaining access to a RAB entry. To prevent the RAB from being filled up by prefetch requests, no more prefetch requests are accepted in one embodiment of the invention when there are six or more valid entries in RAB 24. This allows some entries reserved for urgent demand misses. Since a demand miss can be canceled by a flush operation, one reserved entry is often not sufficient for certain situations. Therefore, two entries in RAB 24 are reserved for demand misses to avoid the RAB stalling on a demand miss. Note that if RAB 24 is completely full, both demand miss pipelines and the prefetch miss pipelines will necessarily stall.

FIG. 4 shows the ITLB first level structure in the address translation hierarchy. In one embodiment of the present implementation, the ITLB is a one-cycle, fully associative, 64-entry structure, CAMMed by virtual addressing. On the instruction fetch side, there is only one level of hierarchy illustrated by block 55. On the data fetch side, there is a first level DTC shown by block 56 and a second level 96-entry L1 DTB 57, to back up the smaller DTC 56.

Once a miss occurs in the L0 ITLB, the miss request is sent to the hardware page walker 58 directly without going through another level of translation look aside buffer. The hardware page walker figures out the hash address of the missed TLB entry and issues a read operation to the L1 combined cache 59. From the L1 cache, hardware page walker 58 loads in the missing page information and returns it to the L0 instruction translation look-aside buffer.

Before the page can be returned back to the L0 ITLB, some faults could occur in the process. These faults are termed pre-translation faults, since they occur before the translation is actually available. When faults happen after the translation (e.g., ITLB hit case), the faults are termed "post-translation" faults.

With reference now to FIG. 5, the structures associated with the scheduling of the RAB entries for a RAB write are illustrated. As can be seen, both the fetch and the prefetch physical addresses are provided into multiplexors 63 and 65, both having outputs which are selected by the output of OR gate 61. OR gate 61 receives the ISB hit and way hit information as its inputs. The scheduling of the RAB entry for write operations (block 34 in FIG. 2) is performed one cycle before the actual write operation in order to reduce timing criticality in sending the RAB ID to the L1 pipeline 75. Since the scheduling is done a cycle early, whether the entry is actually written depends on the miss valid signal generated by miss valid logic block 60 in the ROT stage. To select another RAB entry for write operations, and to avoid the miss valid signal delaying the write scheduling path, the scheduling logic assumes the previously-scheduled RAB entry has been written first, and then selects a new entry for writing. The actual RAB entry for writing is then selected using the miss valid signal between the one scheduled in the previous cycle, and the one generated assuming the previous one has already been written. This is illustrated in FIG. 5 by components 66, 72, 73, and their associated connection lines.

The RAB 24 is written in the second clock phase of the cycle when a request is sent to L1 pipeline 75. The L1 write operation is illustrated in FIG. 5 by block 71. The entry ID is given by the scheduling logic, while the write enable signal is provided by the miss valid logic block 60. Note that a RAB entry can be de-allocated in the second phase in the cycle after a line has been returned back from the L1 cache. The first phase of the de-allocation cycle is used for looking us the RAB to obtain the virtual and physical addresses of the returned line.

FIG. 5 also shows that the RAB has a counter associated with its structure to indicate the number of valid entries in the RAB. RAB counter updating is shown by block 67 in the ROT stage of the pipeline. When the counter indicates there are six or more entries filled (as detected by block 74) a prefetch request cannot be written into the scheduled RAB entry. As explained earlier, this reserves at least two RAB entries for demand misses and avoids filling up the RAB with prefetch requests. In addition, the counter is also utilized to indicate that the RAB is completely full. In such a case, both demand miss and prefetch request need to be stalled. Practitioners familiar with the computer arts will understand that counter updating is performed after RAB 24 has been written, and the RAB entry is de-allocated so that there are no timing issues. The counter value is used in the second phase for detecting full and six-full conditions. Both of these signals are then used in the next cycle by the miss valid logic block 60.

FIG. 7 illustrates a trace cancellation vector and tenure bits used in prefetch cancellation. Since the L1 bandwidth is precious, and the prefetch pipeline throughput accommodates only one prefetch request, each cycle in one implementation of the present invention, prefetch cancellation provides maximum utilization of this limited bandwidth. Prefetch cancellation is achieved using a trace vector which indicates the branch path leading to the target area. A prefetch is canceled to reduce L1 traffic in the case where the prefetch target is not likely to be needed in the near future.

Each branch predict instruction encodes a 3-bit trace vector which indicates eight possible match combinations for two levels of branches. On each level of branch, the outcome may be "taken", "not taken", or "don't care". When the trace vector indicates "taken" and the prediction outcome indicates "not taken", the prefetch request is canceled, and vice-versa. Note that if the trace vector indicates "don't care", the prefetch request is not canceled irrespective of the outcome.

The 2-bit "taken"/"not taken" vector (V1,V0) is accompanied by the tenure bits T0 and T1. These bits which indicate bytes have been checked, or should be "don't care". The tenure bits are first initialized to 1's if the corresponding byte and the trace vector is a "don't care". Together, the tenure bits and trace vector form a 4-bit vector with the tenure bits being in the higher order position. After a branch is entered into the rotate buffer, its predicate prediction is used to cancel prefetches in the next cycle.

L1 Instruction Return Pipeline

The L1 instruction return pipeline delivers request instructions from the L1 cache back to the instruction fetch and prefetch pipelines. These instructions—sent back as a single 32-byte instruction line at the time—are delivered to the instruction fetch and prefetch pipelines for writing into the instruction stream buffer and/or for bypassing into the ROT stage of the instruction fetch pipeline. The return pipeline is illustrated in FIG. 7 and consists of three stages: the ID Return (L1X), Data Return (L1D) and the ISB Data Write (ROT).

In the ID Return stage, the RAB ID, valid bit, and address bit 5 are sent back from the L1 cache to the fetch and prefetch pipelines as an early indication of the returned instruction. This allows the bypass control logic (block 25 in FIG. 1) to make preliminary determinations before the instruction actually arrives. The returned RAB ID and address bit 5 are first latched, and then compared with the RAB ID and address bit 5 of the outstanding demand miss. The ID Return stage is equivalent to the L1X (L1 cache translation) stage of the L1 pipeline.

The next pipeline stage is the Data Return stage. If the return instruction is the same as the demand miss request, the instruction (i.e., data) is selected by the bypass multiplexer 22. The output of multiplexer 22 is coupled into the L0 instruction way multiplexer 20 in the next cycle. Otherwise, the data is latched for writing into the ISB in the next cycle. The ISB write is shown occurring in FIG. 7 by block 82.

As mentioned above, if the data return from the L1 cache is what the demand miss request is actually waiting for, the data is forwarded into the instruction fetch pipeline through the L0 instruction way multiplexer 20. This occurs in the ISB Data Write pipeline stage. Furthermore, during this stage the data is actually written into the ISB; however, before the data is written into the ISB, the virtual address, physical address, and memory attributes of the returned data are first looked-up into the RAB using the returned RAB ID. This is shown occurring in FIG. 7 by block 81. Recall that the L1 cache returns only the RAB ID to save routing space on the chip. The memory attributes indicate whether the data is cacheable; if so, the data is written directly into ISB 23 with its virtual and physical addresses, otherwise the data is dropped.

After the RAB look-up, a state machine in the RAB is updated to reflect that the 32-byte line in the accessed entry has been returned. If all of the requested lines in the RAB entry have been returned, the RAB entry is de-allocated and free for the next request. The de-allocation process is handled in FIG. 7 by block 83.

Block 80 in FIG. 7 illustrates ISB write scheduling, in accordance with the above description.

Missed and Prefetched Data Return and Bypass Operations

To achieve maximum performance, the demand miss and prefetched data cases are aggressively bypassed to the instruction fetch pipeline. As explained earlier, bypasses can happen between a prefetched data to a demand miss, or between the demand fetched data to a demand miss. FIG. 7 shows that the L1 cache data return pipeline has three stages. This means that there are three stages before the data is visible in the ISB.

There are four different bypass sources: L1 return data, latched L1 return data for an ISB write, latched ISB write data, and ISB data. For timing reasons, all of the bypass cases are multiplexed, latched, and then sent to the L0 instruction way multiplexer. The four different bypass sources are illustrated in FIG. 1. Each of these sources are described below.

In the L1 direct bypass case, the return data is exactly what the demand miss is requesting. Since the RAB ID and address bit 5 are sent one cycle early, the detection of the L1 return direct bypass can be performed early in the pipestage. The comparison result can thus be available early enough to set up the bypass multiplexer 22.

In the second case, where L1 return data is latched for an ISB write operation, the latched data is bypassed to the latch prior to the L1 D+1 stage. Bypass checks, however, are performed in the cycle when the data is returned from the L1 cache (i.e., the L1 D stage). Two checks are performed. In the first check, the latched upgrade RAB ID and the latched L1 return RAB ID are checked when the upgrade RAB ID of the demand miss is the same as the latched L1 return RAB ID (in the cycle when the demand miss is sent). This case is called "L1 delayed bypass" because the data cannot be bypassed immediately for timing reasons. The data is bypassed in the L1 D+1 stage.

The second case involves checking the RAB hit ID and the L1 return RAB ID, and occurs when the latched L1 return RAB ID is the same as the RAB CAM hit ID for the current fetch. This second case is called "fetch L1 return bypass". Similar to the first case, the L1 return data cannot be bypassed until the next cycle for timing reasons. Therefore, the results of these two checks are latched and ORed in the next cycle (i.e., L1 D+1) to control the bypass multiplexer.

The third case is the ISB write bypass, which occurs when the RAB CAM hit ID is the same as the RAB ID of the l1 return data being written into the ISB. Since the data is not present in the ISB yet, the ISB would yield a miss for a fetch look-up. However, with this bypass check, the ISB write data can bypass to the fetch. The data is bypassed in the next stage to the write stage, equivalent to the L1 D+2 stage.

Finally, an ISB hit bypass occurs when a fetch address hits in the ISB. This happens in a stage later than the L1 D+1 stage, when the data has already been written in the ISB. The ISB hit signal is latched for one cycle and used in the next cycle for controlling the bypass multiplexer, again for timing reasons. An ISB read can then be carried out in the next cycle.

We claim:

1. Apparatus for prefetching instructions from a first cache to an instruction cache of a processor comprising:

an instruction pointer multiplexer that generates one of a plurality of instruction pointers (IPs) in a first pipeline stage of the processor;

an instruction streaming buffer (ISB) that stores instructions returned from the first cache before they are written into the instruction cache;

an instruction translation look-aside buffer (ITLB) that produces a physical address from the one of the plurality of IPs;

a way multiplexer coupled to the ISB, the way multiplexer having an output that provides an instruction from a set in the instruction cache responsive to a hit signal, a miss signal causing the ISB to be read in a third pipeline stage, with the instruction being bypassed to the way multiplexer from the ISB in response to an ISB hit; and compare logic that performs a comparison, in the first pipeline stage, between the physical address and tags of the set in the instruction cache, the set being associated with the one of the plurality of IPs.

2. The apparatus of claim 1 further comprising a rotate buffer coupled to the output of the way multiplexer, the rotate buffer storing and rotating instructions prior to dispersal within the processor.

3. The apparatus of claim 1 further comprising:

a bypass multiplexer having an output coupled to the way multiplexer and a plurality of inputs coupled to a corresponding plurality of bypass sources;

bypass control logic that selects one of the bypass sources as the output of the bypass multiplexer.

4. The apparatus of claim 3 wherein the bypass sources include return data from the first cache that is yet to be written into the ISB or the instruction cache.

5. The apparatus of claim 1 wherein instructions returned from the first cache are written into the ISB in the third pipeline stage.

6. The apparatus of claim 1 wherein instructions stored in the ISB are marked as accessed or non-accessed, accessed instructions having a higher priority.

7. The apparatus of claim 6 wherein demand fetch instructions are marked accessed, and prefetch instructions are marked non-accessed.

8. The apparatus of claim 6 wherein instructions returned from the first cache are written into a first empty entry of the ISB.

9. The apparatus of claim 1 wherein the first cache comprises a combined data/instruction cache.

10. In a processor having a mechanism for prefetching instructions from a first cache to an instruction cache, a method of operation comprising:

(a) generating an instruction pointer (IP) having an associated virtual address;

(b) performing an instruction translation look-aside buffer (ITLB) lookup using the virtual address, an ITLB hit producing a physical address translation of the virtual address;

(c) performing a lookup in an instruction streaming buffer (ISB) that keeps instructions returned from the first cache before they are written into the instruction cache, the lookup being performed using the virtual address;

(d) reading an instruction which corresponds to the virtual address directly from the ISB without waiting for the instruction to be written into the first cache in response to an ISB hit.

11. The method according to claim 10 wherein the ISB is read in a cycle of the processor following the ITLB lookup.

12. The method according to claim 10 further comprising:
(e) sending a miss request to the first cache in the event of an ISB miss.

13. The method of claim 12 further comprising:
(f) returning the instruction from the first cache for writing to the ISB.

14. The method of claim 13 further comprising:
(g) bypassing the ISB from one of a plurality of bypass sources in response to a demand miss of the processor.

15. The method according to claim 10 further comprising:

marking instructions stored in the ISB as accessed or non-accessed, wherein instructions marked as accessed have a higher priority.

16. The method according to claim 10 further comprising:

marking demand fetch instructions as accessed and prefetch instructions as non-accessed, wherein the demand fetch instructions have a higher priority.

* * * * *